(12) United States Patent
Kronenberg et al.

(10) Patent No.: US 10,205,692 B2
(45) Date of Patent: Feb. 12, 2019

(54) INSTANT MESSAGE SYSTEM FOR SERVICE PROVIDERS

(71) Applicant: service.com Inc., Farmington Hills, MI (US)

(72) Inventors: Sandy Kronenberg, West Bloomfield, MI (US); Paul Proctor, Dearborn Heights, MI (US)

(73) Assignee: Service.com Inc., Farmington Hills, MI (US)

( * ) Notice: Subject to any disclaimer, the term of this patent is extended or adjusted under 35 U.S.C. 154(b) by 0 days.

(21) Appl. No.: 15/392,655

(22) Filed: Dec. 28, 2016

(65) Prior Publication Data

US 2017/0187655 A1   Jun. 29, 2017

Related U.S. Application Data

(60) Provisional application No. 62/272,059, filed on Dec. 28, 2015.

(51) Int. Cl.
*H04L 12/58* (2006.01)
*H04L 29/08* (2006.01)
*H04M 3/22* (2006.01)

(52) U.S. Cl.
CPC ............ *H04L 51/046* (2013.01); *H04L 51/04* (2013.01); *H04L 67/20* (2013.01); *H04L 67/24* (2013.01); *H04M 3/22* (2013.01)

(58) Field of Classification Search
CPC ..................................................... H04L 51/046
See application file for complete search history.

(56) References Cited

U.S. PATENT DOCUMENTS

| | | | |
|---|---|---|---|
| 2014/0164167 A1* | 6/2014 | Taylor | G06Q 30/0611 705/26.4 |
| 2015/0302414 A1* | 10/2015 | Cox | G06Q 30/012 705/7.19 |
| 2015/0370905 A1* | 12/2015 | Leon | G06Q 10/10 707/722 |

* cited by examiner

*Primary Examiner* — Suraj M Joshi
(74) *Attorney, Agent, or Firm* — Adam M. Kehres

(57) ABSTRACT

A method of communication between a customer and a service provider, comprising a hardware processor coupled to a memory storing a plurality of service providers in a business directory, wherein the customer searches through the business directory using an electronic device in order to start a communication with one or more service providers from the business directory, and wherein the communication takes place through the hardware processor and is stored on a remote server.

8 Claims, 1 Drawing Sheet

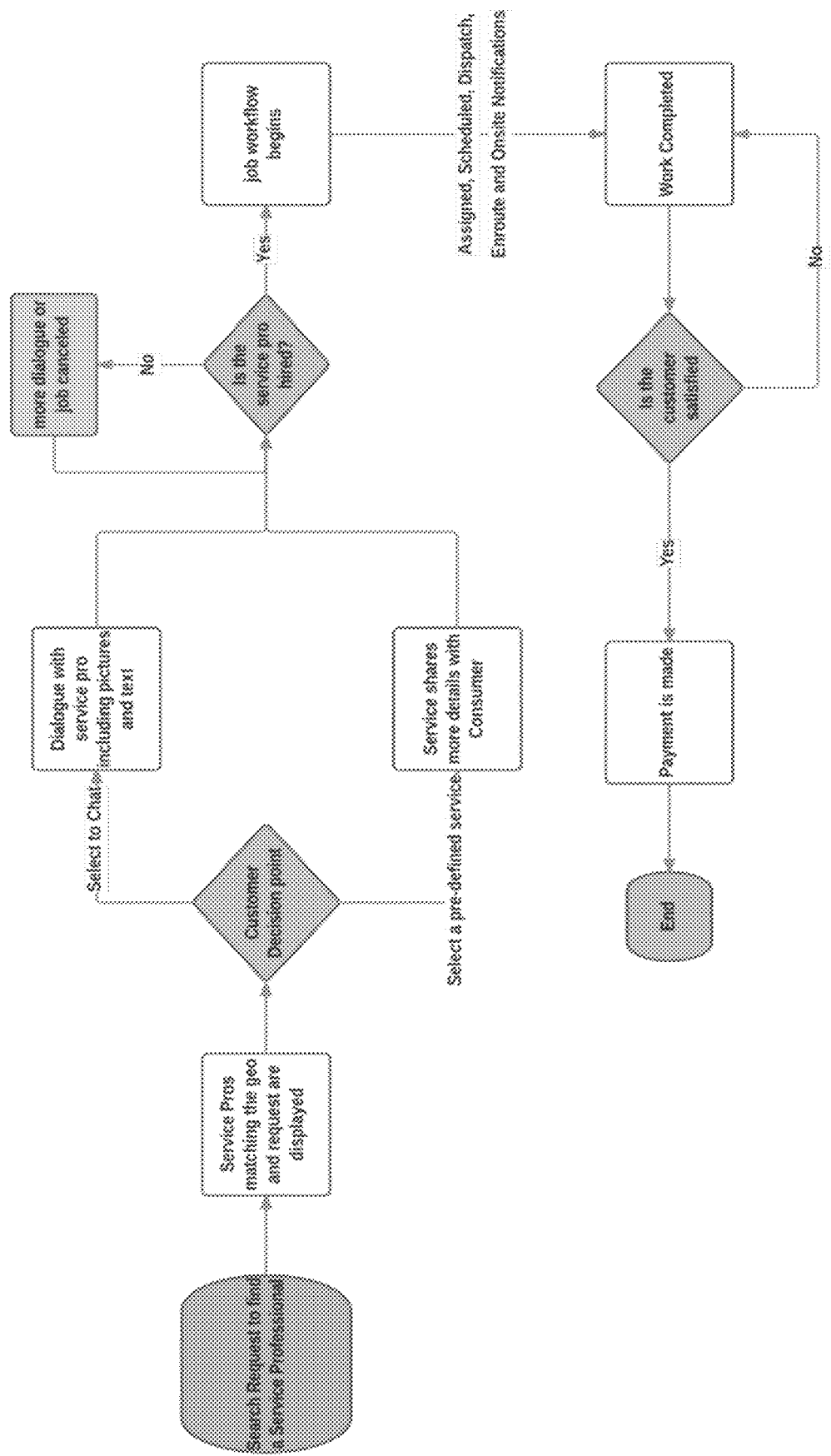

INSTANT MESSAGE SYSTEM FOR SERVICE PROVIDERS

The present application claims the benefits of priority to U.S. Provisional Application No. 62/272,059 filed on Dec. 28, 2015, which is incorporated herein by reference in its entirety.

FIELD

A method of instant messaging between a customer and one or more employees of a business is disclosed herein.

BACKGROUND

The primary modes of communication between a service professional for hire and the consumer wishing to hire them has been either by phone, e-mail or text messaging. These methods of communication each have their pros and cons. Phone calls are real-time and allow for immediate clarification on queries but are single-threaded, both the service pro and the consumer can only realistically be on one call at a time.

More importantly, the history of the call is lost unless it was recorded which is not very practical. E-mail has the benefit of providing history but is often used when near-real-time responses are desired. Text-messaging provides near-real-time responses and history but is often tied to a single cell phone/subscriber and doesn't perform well in a business interaction.

BRIEF SUMMARY

Embodiments disclosed herein seek to provide a method of handling instant messaging sessions and communication between various entities on multiple platforms. According to embodiments, this problem may be solved by providing a method for handling instant messaging sessions, communication between various entities, and a computer program product causing a computer to perform the method for handling instant messaging sessions.

BRIEF DESCRIPTION OF DRAWINGS

FIG. 1 is a flowchart illustrating the process of initiating a communication between a customer and a service provider.

DETAILED DESCRIPTION

As will be appreciated by one skilled in the art, aspects of the embodiments may be a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, JavaScript, Smalltalk, C++ or the like and conventional procedural programming languages, such as the "C" programming language, Python, Dotnet, X code, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer or mobile device, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In order to efficiently communicate a multitude of nuances and aspects associated with any "service", whether it is a simple home cleaning job or a complex new home build, there needs to be an explicit list of instructions, approvals and processes by a multitude of people. These people represent at least two different entities with different interests and motivations but very often a "service" may involve many different entities. Because of the complexities associated with these "services"—project managers and/or general contractors are often employed to manage the "service" to the satisfaction of the entity requesting the "service".

One example of a workflow can be expressed in FIG. 1. According to FIG. 1, a customer may initiate a search for a service professional to perform a service. Upon performing the search, the system may calculate geographically where the request is made, and display a list of relevant professionals within a predetermined geographical area. At this point, the customer may decide to chat with one or more service professionals. The service professionals may or may not be aware of other service professionals that may be involved in the chat as well. Multiple media formats such as text, pictures, and video may be included in the chat, and separate chats between separate service professionals may take place simultaneously. The customer may then make a decision to select a certain service professional to perform a job.

After making a selection, the service professional may share more information with the customer. If the information supplied is sufficient, the customer may elect to hire the service professional. Alternatively, the customer may not elect to hire the service professional, and further dialogue may take place, or the customer may reinitiate a conversation with other service professionals.

Once a service professional is hired, the customer may remain in contact with the service professional via an instant messaging system. Multiple aspects of the job may be communicated through the instant messaging system. Further, multiple members of the service professional may be included in the instant message chat. When the instant messaging system recognizes certain key words within the chat, a certain member of the service professional may be notified directly to provide a more focused response to a question or concern. Certain members of the service professional may also be notified of contact depending on the time of day the contact is initiated or the type of work being performed.

The customer or the service professional may also choose to include a third party in the instant message chat. The third party member may provide mitigation methods or opportunities in the case where a customer is not satisfied with the work product. The instant message chat may also provide means for issuing and approving quotes for jobs, generating and approving invoices for jobs, sending a request for payment of an invoice and making a payment on an invoice, and sending notifications on job progress or status. Financing opportunities, suggestions, or methods may be presented through the instant message chat. Either the customer or the service professional may be provided with financing opportunities, depending on certain situations.

Other information which may be provided via the instant message chat may include sending en-route notifications, job completion notifications, employee assignment notifications, employee schedule notifications, dispatch notifications, job cancellation notifications, and job completions notifications. Further, follow-up provisions may be provided through the instant message chat, including opportunities to rate the service professional, the customer, or the instant message system as a whole, surveys about the work done, the process of acquiring a service professional, or the like, or other marketing materials about future jobs or opportunities. Customer satisfaction may be checked after completion of a job, and the invoice may be issued by the service professional via the instant message system.

What is claimed is:

1. A method of communication between a customer and a service provider comprising a hardware processor coupled to a memory storing a plurality of service providers in a business directory, wherein the customer performs the steps of:
   searching the business directory using an electronic device in order to start a communication with one or more service providers from the business directory;
   selecting at least one service provider from the one or more service providers; and
   initiating an electronic communication with the one or more service providers, wherein the electronic communication takes place through the hardware processor and the electronic communication k stored on a remote server, wherein the electronic communication includes text, pictures, and video, wherein the hardware processor is configured to recognize an input within the electronic communication including at least one of a key word, a key phrase, a unique ID, a tracking code, a phone number, an email address, a geo-location, a dollar amount, a time stamp, or a picture, and route the electronic communication to a specific individual related to the input, wherein when two or more service providers are selected, the customer sends a single message to each service provider to which each service provider responds without knowledge of the other service providers included in the electronic communication, and wherein one of the customer and the one or more service providers is able to introduce a third party at any time during the electronic communication.

2. The method of claim 1, wherein the electronic device is one of a mobile device, a personal computer, and a personal tablet.

3. The method of claim 1, wherein the one or more service providers each include multiple workers, and the electronic communication switches between the multiple workers depending on a work flow required by the customer.

4. The method of claim 1, wherein the remote server automatically creates an appointment and alerts the one or more service providers and the customer with an appointment time and location based on the electronic communication.

5. The method of claim 4, wherein the customer and the one or more service providers receive push notifications from the remote server notifying the customer and the one or more service providers of changes to the appointment.

6. The method of claim 1, wherein appointment times may be automatically scheduled and stored in the remote server based on the electronic communication.

7. The method of claim 1, wherein the specific individual is an employee within the one or more service providers, a third party individual, or an automated bot configured to perform a specific task related to the input.

8. The method of claim 7, wherein the third party individual is one of a different service provider or an intermediary.

* * * * *